(12) United States Patent
Held

(10) Patent No.: US 11,585,244 B2
(45) Date of Patent: *Feb. 21, 2023

(54) SYSTEMS AND METHODS FOR GENERATING ELECTRICITY VIA A PUMPED THERMAL ENERGY STORAGE SYSTEM

(71) Applicant: Echogen Power Systems, LLC, Akron, OH (US)

(72) Inventor: Timothy Held, Akron, OH (US)

(73) Assignee: SUPERCRITICAL STORAGE COMPANY, INC., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,190

(22) Filed: Nov. 8, 2021

(65) Prior Publication Data
US 2022/0056817 A1    Feb. 24, 2022

Related U.S. Application Data

(63) Continuation of application No. 16/453,739, filed on Jun. 26, 2019, now Pat. No. 11,187,112.

(60) Provisional application No. 62/690,803, filed on Jun. 27, 2018.

(51) Int. Cl.
| | |
|---|---|
| F01K 3/12 | (2006.01) |
| F01K 3/08 | (2006.01) |
| F01K 7/16 | (2006.01) |
| F01K 19/00 | (2006.01) |
| F28D 17/04 | (2006.01) |
| F01K 13/00 | (2006.01) |
| F01K 7/38 | (2006.01) |
| F01K 23/02 | (2006.01) |

(Continued)

(52) U.S. Cl.
CPC .............. *F01K 3/12* (2013.01); *F01K 3/08* (2013.01); *F01K 7/165* (2013.01); *F01K 7/38* (2013.01); *F01K 13/00* (2013.01); *F01K 19/00* (2013.01); *F01K 23/02* (2013.01); *F02C 1/10* (2013.01); *F28D 17/04* (2013.01); *F28D 2020/006* (2013.01); *Y02E 60/14* (2013.01)

(58) Field of Classification Search
CPC . Y02E 60/14; F02C 1/10; F02C 1/105; F28D 20/00–028
See application file for complete search history.

(56) References Cited

U.S. PATENT DOCUMENTS 11,187,112 B2 * 11/2021 Held ...................... F28D 17/04

* cited by examiner

*Primary Examiner* — Laert Dounis
(74) *Attorney, Agent, or Firm* — Nolte Lackenbach Siegel

(57) ABSTRACT

Systems and methods are provided for charging a pumped thermal energy storage ("PTES") system. A system may include a compressor or pump configured to circulate a working fluid within a fluid circuit, wherein the working fluid enters the pump at a first pressure and exits at a second pressure; a first heat exchanger through which the working fluid circulates in use; a second heat exchanger through which the working fluid circulates in use; a third heat exchanger through which the working fluid circulates in use, a turbine positioned between the first heat exchanger and the second heat exchanger, configured to expand the working fluid to the first pressure; a high temperature reservoir connected to the first heat exchanger; a low temperature reservoir connected to the second heat exchanger, and a waste heat reservoir connected to the third heat exchanger.

13 Claims, 8 Drawing Sheets

(51) Int. Cl.
*F02C 1/10* (2006.01)
*F28D 20/00* (2006.01)

SYSTEMS AND METHODS FOR GENERATING ELECTRICITY VIA A PUMPED THERMAL ENERGY STORAGE SYSTEM

CROSS-REFERENCE TO RELATED APPLICATIONS

This application claims priority to U.S. Prov. Appl. No. 62/690,803, filed Jun. 27, 2018 and to U.S. Non-Provisional patent application Ser. No. 16/453,739 filed Jun. 26, 2019. These applications are incorporated herein by reference in their entirety for all purposes, including the right of priority.

BACKGROUND

Pumped thermal energy storage ("PTES") systems, also known as electro-thermal energy storage systems, are used to store and generate energy. PTES systems generally consist of a configurable thermodynamic cycle where thermal energy is transferred between a high temperature reservoir and a low temperature reservoir via working fluid in a working fluid circuit.

During a "charging" cycle of operation, the thermodynamic cycle, which is a heat pump cycle in a nominally forward direction, may be used to increase the thermal energy in the high temperature reservoir. In some instances, an electrical motor may be used to drive a compressor, which increases the pressure and temperature of the working fluid, whereby the thermal energy in the fluid is transferred to and stored in the high temperature reservoir by using a high temperature heat exchanger. Following the heat transfer to the high temperature reservoir, the fluid may be expanded through a turbine, which produces shaft work that may be used to drive the gas compressor. This working fluid expansion may lower the pressure and temperature of the working fluid. After exiting the turbine, the working fluid may pass through a low temperature heat exchanger that is connected to a low temperature reservoir and may affect transfer of heat from the low temperature reservoir to the working fluid. Upon exit from the low temperature heat exchanger, the working fluid may be returned to approximately its initial state (i.e., pressure and temperature).

During a "generating" cycle of operation, the directions of fluid and heat circulation are reversed. A pump may increase the pressure of the working fluid and move the working fluid through the high temperature heat exchanger, which transfers heat from the high temperature reservoir to the working fluid. The heated working fluid may be expanded by a turbine, producing shaft work. The shaft work from the turbine may exceed the compressor work, and the excess work may be converted to electrical power by a generator and distributed to an electrical grid electrically coupled to the generator. Following the turbine expansion, the working fluid may be cooled by passing through the low temperature heat exchanger that is connected to a low temperature reservoir before entering the pump. Upon exit of the low temperature heat exchanger, the working fluid may be returned to approximately its initial state (i.e., pressure and temperature).

One metric used to determine performance of a PTES system is round trip efficiency ("RTE"). Round trip efficiency is defined as the amount of electrical energy that may be produced during the generating cycle divided by the amount of electrical energy that was consumed during the charging cycle. Due to thermodynamic irreversibilities, pressure losses, and finite temperature approaches through the heat exchangers, the RTE values of PTES systems, as described above, are generally calculated at around 55-56%. Therefore, there is a need for an improved PTES system and method that results in a higher RTE, and greater electricity generation.

SUMMARY

A charging system in a PTES may include a fluid circuit configured to circulate a working fluid therethrough, the fluid circuit may include: a first heat exchanger through which the working fluid circulates in use; a second heat exchanger through which the working fluid circulates in use; a third heat exchanger through which the working fluid circulates in use; a compressor through which the working fluid circulates in use, wherein the working fluid enters the second heat exchanger at a first temperature and the working fluid exits the second heat exchanger at a second temperature, wherein the working fluid enters the third heat exchanger at the second temperature and the working fluid exits the third heat exchanger at a third temperature, wherein the working fluid enters the compressor at the third temperature and a first pressure, and the working fluid exits the compressor at a fourth temperature and a second pressure, and wherein the working fluid enter the first heat exchanger at the fourth temperature and the working fluid exits the first heat exchanger at a fifth temperature, the fifth temperature being lower than the fourth temperature; a turbine positioned between the first heat exchanger and the second heat exchanger, the turbine configured to expand the working fluid to the first temperature and the first pressure; a high temperature reservoir connected to the first heat exchanger and configured to transfer thermal energy to and from the working fluid; a low temperature reservoir connected to the second heat exchanger and configured to transfer thermal energy to and from the working fluid; and a waste heat reservoir connected to the third heat exchanger and configured to transfer thermal energy to and from the working fluid.

A generation system in a PTES system, may include: a fluid circuit for the circulation of a working fluid therethrough, the working fluid may include a first portion and a second portion comingled together, the fluid circuit may include: a pump to circulate the working fluid within the fluid circuit, wherein the working fluid enters the pump at a first pressure, and the working fluid exits the pump at a second pressure, a first heat exchanger through which the working fluid circulates in use; a second heat exchanger through which the working fluid circulates in use; a first turbine positioned between the first heat exchanger and the second heat exchanger and wherein the first turbine is for expanding the working fluid to a third pressure, the third pressure greater than the first pressure and less than the second pressure; a separation location where the working fluid is separated into the first portion and the second portion, a second turbine positioned between the first heat exchanger and the second heat exchanger and wherein the second turbine if for expanding the first portion of the working fluid to the first pressure; an auxiliary line through which the second portion of the working fluid circulates between the turbine and the first heat exchanger, a third heat exchanger through which the working fluid circulates in use positioned between an outlet of the turbine and an inlet of a heat rejection heat exchanger, and in fluid communication with the auxiliary line, wherein the third heat exchanger removes thermal energy from the second portion of the working fluid; the heat rejection heat exchanger positioned between an outlet of the third heat exchanger and an inlet of the first heat exchanger, and in fluid communication with the auxiliary line, wherein the heat rejection heat exchanger removes thermal energy from the second portion of the working fluid; a high temperature reservoir connected to the first heat exchanger for transferring thermal energy to and from the working fluid; a low temperature reservoir connected to the second heat exchanger for transferring thermal energy to and from the working fluid and a waste heat reservoir connected to the third heat exchanger for transferring thermal energy to and from the working fluid.

A method for charging a pumped thermal energy system, may include: circulating a working fluid through a fluid circuit, wherein the fluid circuit may include a first heat exchanger, a second heat exchanger, and a third heat exchanger connected thereto; circulating the working fluid through the second heat exchanger; providing thermal energy from the second heat exchanger to the working fluid; circulating the working fluid through a recuperator; circulating the working fluid through the third heat exchanger, wherein a waste heat reservoir storing waste heat transfers thermal energy to the working fluid to increase its temperature; circulating the working fluid through a compressor; and circulating the working fluid through the first heat exchanger to transfer thermal energy from the working fluid to a high temperature reservoir connected to the first heat exchanger.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
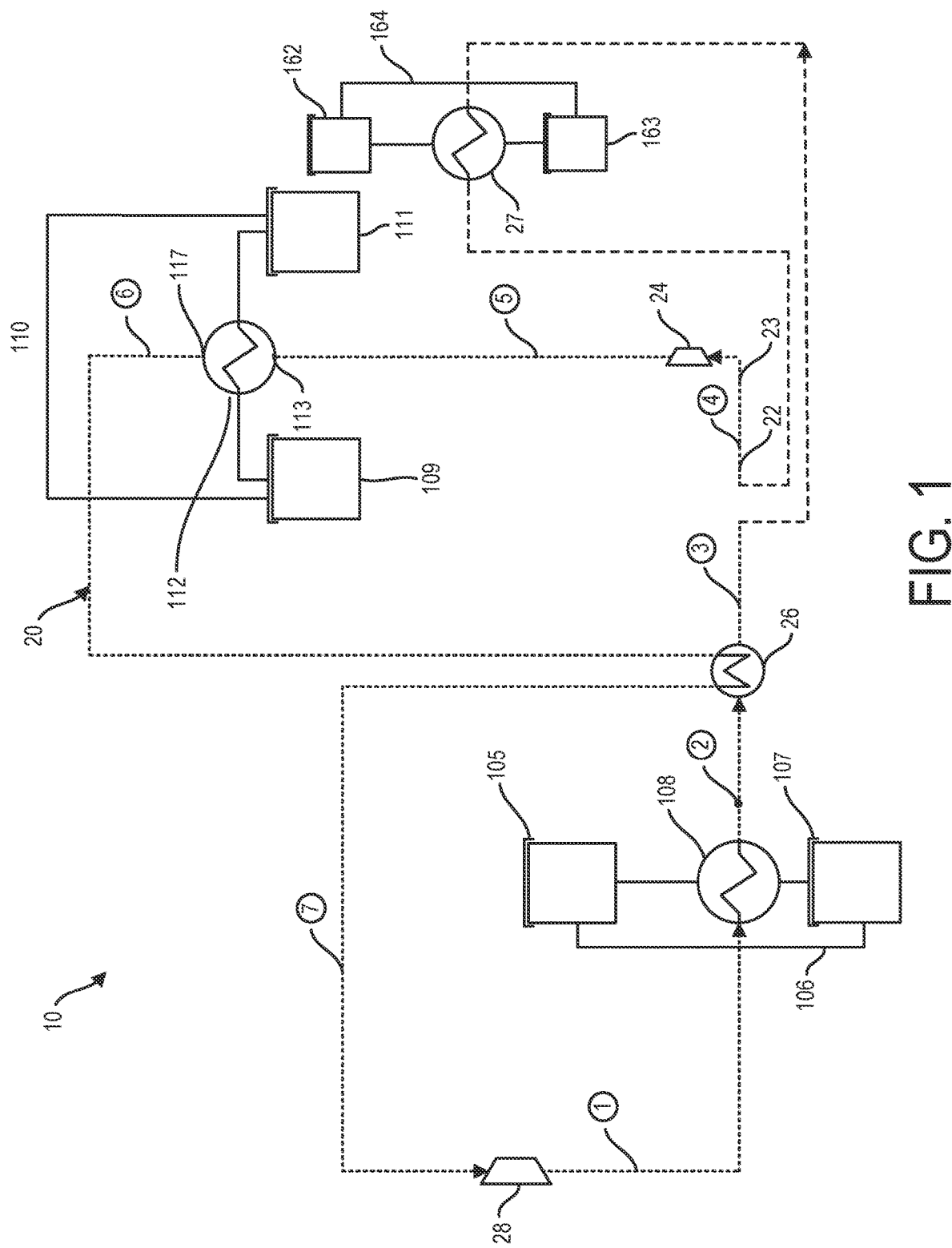
FIG. 1 is a schematic of a charging system of a pumped thermal energy storage ("PTES") system, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
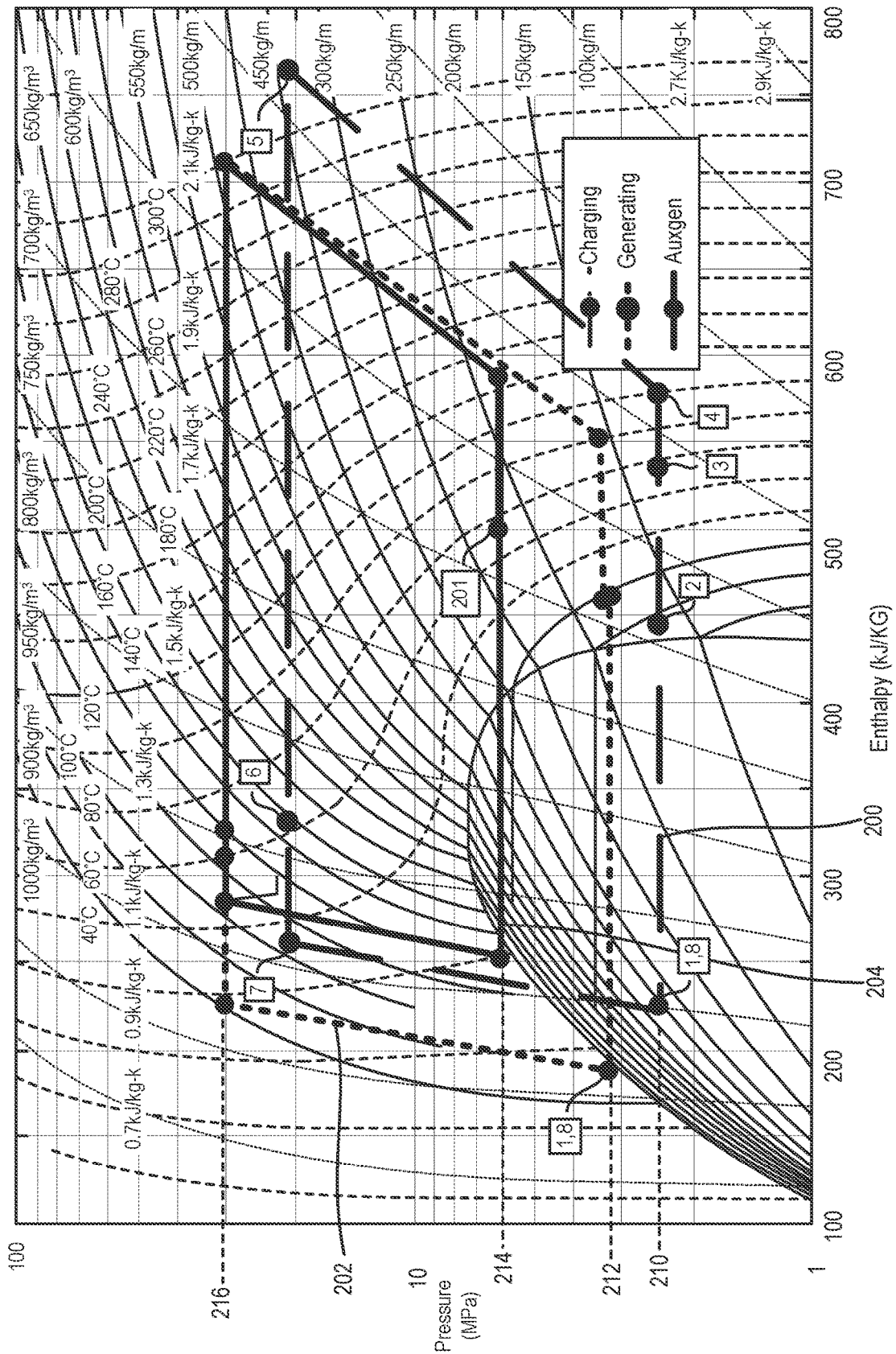
FIG. 2 is a pressure enthalpy diagram for the different cycles of operation of the PTES system of FIG. 1, according to one or more embodiments.

The following disclosure is directed to improved PTES systems that may result in an increased RTE in one or more embodiments. As will be discussed in more detail herein, during the charging cycle, the PTES system may include three heat exchangers, a first, second, and third heat exchanger. The three heat exchangers may introduce thermal energy to and receive thermal energy from a working fluid within a fluid circuit of the PTES system. A high temperature reservoir, a low temperature reservoir, and a waste heat reservoir may each be associated with a particular heat exchanger, may provide the thermal energy to the heat exchangers, and may receive the thermal energy from the heat exchangers. The waste heat reservoir may store heat from the generating cycle of the PTES system. The working fluid may be split into portions and moved through one or more heat exchangers to receive and provide thermal energy to and from the one or more heat exchangers and associated reservoirs. During the charging cycle, providing thermal energy from the waste heat reservoir to the working fluid, after the working fluid moves through the heat exchanger associated with the low temperature reservoir, may increase the RTE of the PTES system FIG. 1 is a schematic of a charging system 20 of a PTES system 10, according to one or more embodiments disclosed. FIG. 2 is a pressure enthalpy diagram for the different cycles of operation of the PTES system 10, according to one or more embodiments. The charging system 20 may circulate a first working fluid 22 in a first fluid circuit 23 during a charging cycle 200 of the PTES system 10. FIG. 1 depicts different states of the first working fluid 22 in the first fluid circuit 23 during the charging cycle 200, which are indicated with circled reference numbers. These reference numbers correlate to the circled reference numbers shown in FIG. 2.

Referring to FIG. 1 and FIG. 2, the PTES system 10 may include a high temperature reservoir 110, a low temperature reservoir 106, and a waste heat reservoir 164. The PTES system 10 may include a first heat exchanger 112, a second heat exchanger 108, and a third heat exchanger 27. The first heat exchanger 112 may be fluidly connected to the high temperature reservoir 110. The second heat exchanger 108 may be fluidly connected to the low temperature reservoir 106. The third heat exchanger 27 may be fluidly connected to the waste heat reservoir 164. The high temperature reservoir 110 may include a first material that has a higher temperature than a second material that is included in the low temperature reservoir 106. The waste heat reservoir 164 may include a third material that has a higher temperature than the first material in the low temperature reservoir 106.

The high temperature reservoir 110, which may contain the first material that may be utilized by the first heat exchanger 112, may transfer thermal energy to and from the first working fluid 22. The first material may be or include thermal oil, molten salt, water, particulate such as sand or gravel, concrete, encapsulated phase-change materials, bulk phase-change materials, a combination therein, or any other material suitable for use in the high temperature reservoir 110. The high temperature reservoir 110 may include a plurality of vessels, for example, a first high temperature vessel 109 and a second high temperature vessel 111 that may be in fluid communication with one another. However, the high temperature reservoir 110 may be a single vessel or three or more vessels in other embodiments. The first material may circulate between the first high temperature vessel 109 and the second high temperature vessel 111. The first material may be at a first high temperature in the first high temperature vessel 109 and at a second high temperature in the second high temperature vessel 111. The first high temperature may be higher than the second high temperature and vice-versa. The first material may circulate through the first heat exchanger 112 to transfer thermal energy to and from the first working fluid 22 of the PTES system 10. The first heat exchanger 112 may be a conventional heat exchanger, a printed circuit heat exchanger, a moving bed heat exchanger, a fluidized bed heat exchanger, or a packed bed thermocline.

The low temperature reservoir 106, which may include the second material that may be utilized by the second heat exchanger 108, may transfer thermal energy to and from the first working fluid 22. The second material may be or include water, glycol, ice, seawater, ethanol, low-temperature thermal oil, hydrocarbon fluid, a combination thereof, or any other material suitable for use in a low temperature reservoir 106. The low temperature reservoir 106 may include a plurality of vessels, for example, a first low temperature vessel 105 and a second low temperature vessel 107 that may be in fluid communication with one another. However, the low temperature reservoir 106 may be a single vessel or three or more vessels in other embodiments. The second material may circulate between the first low temperature vessel 105 and the second low temperature vessel 107. The second material may be at a first low temperature in the first low temperature vessel 105 and at a second low temperature in the second low temperature vessel 107. The first low temperature may be higher than the second low temperature and vice-versa. The second material may circulate through the second heat exchanger 108 to transfer thermal energy to and from the first working fluid 22 of the PTES system 10.

Similarly, the waste heat reservoir 164, which may include the third material that may be utilized by the third heat exchanger 27, may transfer thermal energy to and from the first working fluid 22. The third material may be or include thermal oil, molten salt, water, particulate such as sand or gravel, concrete, encapsulated phase-change materials, bulk phase-change materials, a combination therein, or any other material suitable for use in the waste heat reservoir 164. The waste heat reservoir 164 may include a plurality of vessels, for example, a first waste heat vessel 162 and a second waste heat vessel 163 that may be in fluid communication with one another. However, the waste heat reservoir 164 may be a single vessel or three or more vessels in other embodiments. The third material may circulate between the first waste heat vessel 162 and the second waste heat vessel 163. The third material may be at a first waste heat temperature in the first waste heat vessel 162 and at a second waste heat temperature in the second waste heat vessel 163. The first waste heat temperature may be higher than the second waste heat temperature and vice-versa. The third material may circulate through the third heat exchanger 27 to transfer thermal energy to and from the first working fluid 22 of the PTES system 10. The third heat exchanger 27 may be a conventional heat exchanger, a printed circuit heat exchanger, a moving bed heat exchanger, a fluidized bed heat exchanger, or a packed bed thermocline.

Referring to FIG. 1 and FIG. 2, during the charging cycle 200 of operation, as depicted with the dashed lines in FIG. 1, the PTES system 10 may use the charging system 20 to transfer thermal energy to the high temperature reservoir 110 by utilizing a reversible heat pump cycle. The charging system 20 may include a compressor 24 and a turbine 28 fluidly connected to the first heat exchanger 112 and the second heat exchanger 108. The compressor 24 may be a compressor driven by an electrical motor (not separately shown). The compressor 24 and/or the turbine 28 may circulate the first working fluid 22 through the charging system 20. One or more pumps, compressors, or turbines, not shown, may be incorporated to circulate the first working fluid 22 through the charging system 20.

The turbine 28 and the compressor 24 may be in fluid communication with the first fluid circuit 23 and may be positioned in the first fluid circuit 23 between the first heat exchanger 112 and the second heat exchanger 108. Prior to entering the second heat exchanger 108, the first working fluid 22 may be at a first state 1, wherein the temperature and pressure of the first working fluid 22 may be low. The first fluid circuit 23 at the first state 1 may be at a first pressure 210 of the first fluid circuit 23 at an inlet of the second heat exchanger 108, and the first pressure 210 may be the lowest pressure of the first fluid circuit 23 over the course of one cycle through the first fluid circuit 23. In embodiments, the first pressure 210 may be about equal to from about 1.5 MPa to about 4.5 MPa.

In the second heat exchanger 108, thermal energy may pass from the second material of the low temperature reservoir 106 to the first working fluid 22. The first working fluid 22 may therefore exit the second heat exchanger 108 at a higher temperature and may flow into a recuperator 26 where additional thermal energy may be transferred to and from the first working fluid 22. After the first working fluid 22 is discharged from the second heat exchanger 108, the temperature of the first working fluid 22 may be increased to a second state 2. The temperature of the first working fluid 22 after passing through the recuperator 26 may result in a third state 3. The first working fluid 22 may enter the third heat exchanger 27 to further increase the temperature of the first working fluid 22.

The third heat exchanger 27 may receive thermal energy from any heat source. For example, thermal energy may be transferred from the third material of the waste heat reservoir 164 through the third heat exchanger 27 and to the first working fluid 22 to further increase the temperature of the first working fluid 22. In other embodiments, thermal energy from a separate industrial process, not shown, may be transferred continuously or on an as needed basis from the separate industrial process to the third heat exchanger 27 for further transfer to the first working fluid 22. The separate industrial process can be any process that generates heat. For example, the separate industrial process can be a power generation process producing waste heat, for example steam; a chemical process such as petrochemical cracking processes or other chemical synthesis processes producing waste heat; or any process producing waste heat.

After exiting the third heat exchanger 27, the first working fluid 22 may be in a fourth state 4. The first working fluid 22 may enter the compressor 24 to increase the temperature and pressure of the first working fluid 22 to a fifth state 5. After exiting the compressor 24, the first working fluid 22 may be at a temperature of between about 300 C and about 360 C and at a pressure of between about 15 MPa and about 25 MPa. With the energy in the first working fluid 22 at the fifth state 5, the first working fluid 22 may be used to increase the thermal energy or charge the high temperature reservoir 110 by passing the first working fluid 22 the first heat exchanger 112. As the first working fluid 22 passes through the first heat exchanger 112, the energy within the first working fluid 22 decreases to a sixth state 6.

In the first heat exchanger 112, thermal energy may pass from the first working fluid 22 into the first material of the high temperature reservoir 110 where the thermal energy may be stored. The first working fluid 22 may therefore exit the first heat exchanger 112 at a lower temperature and may flow into a recuperator 26 where additional thermal energy may be transferred to and from the first working fluid 22. The recuperator 26 may be positioned between the second heat exchanger 108 and the compressor 24, and in fluid communication therein. The turbine 28 may be positioned between the recuperator 26 and the second heat exchanger 108.

After circulating through the recuperator 26 and emerging in the state 7, the first working fluid 22 may be expanded in the turbine 28 to return the first working fluid 22 to the first state 1. The pressure of the first working fluid 22 upon exit from the turbine 28 may be substantially the same as the pressure at the inlet of the compressor 24. In embodiments, a positive displacement expander, an expansion valve, or a fluid orifice may be used in conjunction or in place of the turbine 28 to expand the first working fluid 22. During the charging cycle 200 of operation, the PTES system 10 may expend electrical energy to charge or provide thermal energy to the high temperature reservoir 110 via a substantially reversible pump cycle.

The waste heat reservoir 164 may store thermal energy. The thermal energy may be introduced to the third material of the waste heat reservoir 164 from any heat source. As described below, the thermal energy may be introduced to the third material of the waste heat reservoir 164 from waste heat created in the generating cycle of the PTES system 10.

Figure 3:
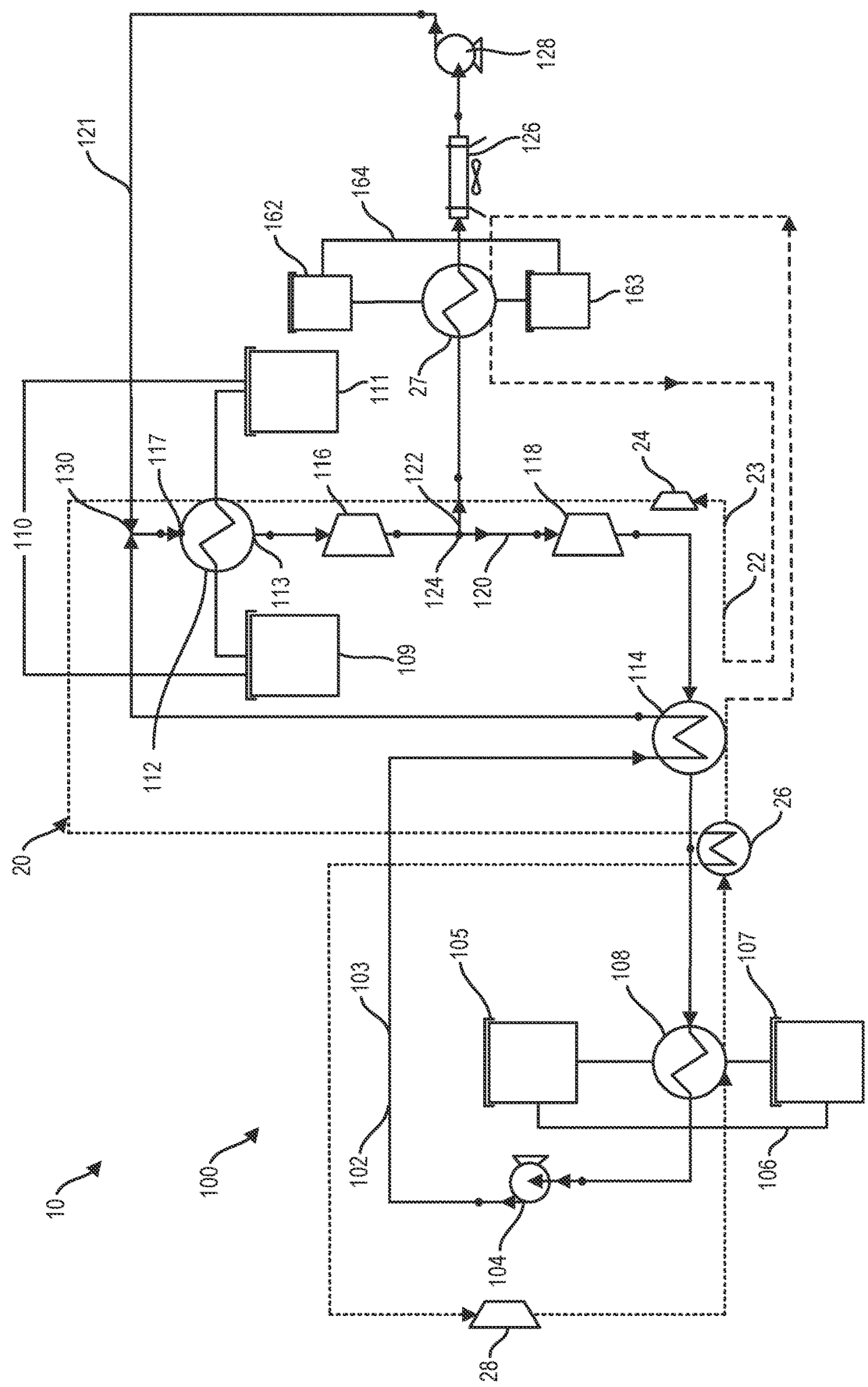
FIG. 3 is a schematic of the charging system shown in FIG. 1 and a generating system of the PTES system, according to one or more embodiments disclosed.

FIG. 3 is a schematic of the charging system 20 shown in FIG. 1 and a generating system 100 of the PTES system 10, according to one or more embodiments disclosed. The PTES system 10 may use a thermodynamic cycle to generate electrical power. The PTES system 10 may include the charging system 20 and the generating system 100. The generating system 100 may circulate the second working fluid 102 in a second fluid circuit 103 during a generating cycle 202 of the PTES system 10, and the charging system 20 may circulate the first working fluid 22 in the first fluid circuit 23 during a charging cycle 200 of the PTES system 10. Each of these cycles 200 and 202 are reflected in the pressure-enthalpy diagram of FIG. 2 as discussed herein. It should be understood that the first fluid circuit 23 and the second fluid circuit 103 may be combined into and operate as a single fluid circuit, not shown.

Returning to FIG. 3, the first working fluid 22 and the second working fluid 102 may be the same fluid or may be different fluids. The first and second working fluids 22 and 102 may flow through the first fluid circuit 23 and/or the second fluid circuit 103. The first working fluid 22 and the second working fluid 102 of the charging system 20 and the generating system 100, respectively, may be or include carbon dioxide ($CO_2$), ammonia, water, propane, butane, pentane, r245fa, or other fluids suitable for use in the generating system 100 and/or the charging system 20. The first fluid circuit 23 and the second fluid circuit 103 may be closed. The PTES system 10 may use either the charging system 20 or the generating system 100 at a given time. The PTES system 10 may use the charging system 20 and the generating system 100 at the same time.

The high temperature reservoir 110, which may include the first material that is utilized by the first heat exchanger 112, may transfer thermal energy to and from the second working fluid 102 of the PTES system 10. Similarly, the low temperature reservoir 106, which may include the second material that is utilized by the second heat exchanger 108, may transfer thermal energy to and from the second working fluid 102 in the PTES system 10. The waste heat reservoir 164, which may include the third material that may be utilized by the third heat exchanger 27, may transfer thermal energy to and from the second working fluid 102 of the PTES system 10.

In the generating cycle 202 of operation, the PTES system 10 may transfer thermal energy transfer from the first heat exchanger 112 to generate electricity from the PTES system 10. The generating system 100 of the PTES system 10 may include a first pump 104 to circulate the second working fluid 102 through the second fluid circuit 103 of the PTES system 10. The first pump 104 may use electrical energy to perform work. The first pump 104 may be fluidly connected to the first heat exchanger 112, the second heat exchanger 108, and the third heat exchanger 27. The first pump 104 may facilitate the transfer of thermal energy between the high temperature reservoir 110 and the second working fluid 102 via the first heat exchanger 112, the first pump 104 may facilitate the transfer of thermal energy between the low temperature reservoir 106 and the second working fluid 102 via the second heat exchanger 108, and may facilitate the transfer of thermal energy between the waste heat reservoir 164 and the second working fluid 102 via the third heat exchanger 27.

As depicted, with reference to FIG. 2, and FIG. 3, the PTES system 10 may include a recuperator 114 positioned in the second fluid circuit 103 between and in fluid communication with the first pump 104 and the first heat exchanger 112. The recuperator 26 and the recuperator 114 may be separate recuperators as depicted or may be the same recuperator. The recuperator 114 may be in fluid communication with the first pump 104 and the first heat exchanger 112. Prior to discharge from the first pump 104, the second working fluid 102 may be at a temperature and pressure that may be low. The second fluid circuit 103 may be at a first pressure 212 of the second fluid circuit 103 at an inlet of the first pump 104, and the first pressure 212 may be the lowest pressure of the second fluid circuit 103 over the course of one cycle through the second fluid circuit 103. In embodiments, the first pressure 212 may be equal to from about 1.5 MPa to about 4.5 MPa.

After the second working fluid 102 is discharged from the first pump 104, the pressure and temperature of the second working fluid 102 may be increased. The second fluid circuit 103 have a second pressure 216 at an outlet of the first pump 104. The second pressure 216 may be the highest pressure of the second working fluid 102 over the course of one cycle through the second fluid circuit 103. In embodiments, the second pressure 216 may be about equal to from about 25 MPa to about 35 MPa. The temperature of the second working fluid 102 may be further increased as the second working fluid 102 circulates through the recuperator 114. The second working fluid 102 may enter an inlet 117 of the first heat exchanger 112 and thermal energy may be passed from the high temperature reservoir 110 to the second working fluid 102 to increase the temperature of the second working fluid 102. During one cycle of the generation cycle 200, the PTES system 10 may exhibit the greatest amount of enthalpy after exiting an outlet 113 of the first heat exchanger 112.

The generating system 100 may further include a first turbine 116 and a second turbine 118 that may each be fluidly connected to the second fluid circuit 103 and positioned between the first heat exchanger 112 and the recuperator 114. While FIG. 3 depicts the first turbine 116 and the second turbine 118 as separate components, the first turbine 116 and the second turbine 118 may be combined or replaced by a single multi-stage turbine, not shown.

In embodiments, the first turbine 116 may be positioned between the first heat exchanger 112 and the second turbine 118. After the second working fluid 102 exits the first heat exchanger 112, the second working fluid 102 may be expanded in the first turbine 116, producing shaft work. The expansion of the second working fluid 102 may decrease the pressure of the working fluid to a third pressure 214. The third pressure 214 may be greater than the first pressure 212 and less than the second pressure 216. The third pressure 214 may be about equal to from about 6 MPa to about 7 MPa. After exiting the first turbine 116 and before entering the second turbine 118, the second working fluid 102 may be separated into a first portion 120 and a second portion 122 at a separation point 124 in the second fluid circuit 103. For clarity, it should be noted that the second working fluid 102 may include commingled portions of the first portion 120 and the second portion 122 as the generating cycle repeats.

The first portion 120 may continue to the second turbine 118 where the first portion 120 may be further expanded, producing additional shaft work. The second expansion of the first portion 120 may further decrease the pressure of the second working fluid 102. The first portion may be at the first pressure 212 and returned to substantially the same pressure as that of the eighth state 8. The low pressure in the eighth state 8 may be about equal to from about 1.5 MPa to about 4.5 MPa. The combined turbine work from the first turbine 116 and the second turbine 118 may exceed the pump work from the generating cycle 202 of operation, and the excess energy may be converted to electrical power by a generator (not shown) and fed into an electrical grid (not shown).

Following the exit from the second turbine 118, the first portion 120 of the second working fluid 102 may circulate through the recuperator 114 thereby transferring some of its thermal energy to the second working fluid 102 passing through the recuperator 114. The second heat exchanger 108 may be in fluid communication with and positioned in the second fluid circuit 103 between the recuperator 114 and the first pump 104. Thermal energy may be transferred from the first portion 120 to the low temperature reservoir 106, which may return the first portion 120 of the second working fluid 102 to substantially the eighth state 8 (both in temperature and pressure) before once again entering the first pump 104. It should be noted that the eighth state 8 may have the same temperature and pressure as the first state 1 and the changes in enthalpy and pressure for the generating system 100 may operate approximately within the enthalpy and pressure ranges of the charging system 20.

At a separation point 124 of the second working fluid 102, the second portion 122 of the second working fluid 102 may flow into an auxiliary line 121. The separation point 124 may be positioned between the first turbine 116 and the second turbine 118. The auxiliary line 121 may be positioned between the first turbine 116 and the inlet 117 of the first heat exchanger 112 and may be part of the second fluid circuit 103. The flow of the second portion 122 of the second working fluid 102 through the auxiliary line 121 may define an auxiliary flow path 204 of the PTES system. The auxiliary line 121 and the auxiliary flow path 204 may terminate at a combination point 130 that is positioned before an inlet 117 of the first heat exchanger 112. At the combination point 130, the second portion 122 may be combined with the first working fluid 102 such that the first portion 120 and the second portion 122 may be comingled.

In the multi-stage turbine, the first and second portions of the second working fluid 102 may be separated from the second working fluid 102 through the multi-stage turbine after a first expansion stage and prior to a subsequent expansion stage. The second working fluid 102 may enter an inlet of the multi-stage turbine at the second pressure 216 and the second working fluid 102 may be split into the first portion 120 and the second portion 122 within the multi-stage turbine. The first portion 120 of the second working fluid 102 may be expanded and exit a first outlet of the multi-stage turbine at the first pressure 212 and the second portion 122 of the second working fluid 102 may be expanded and exit a second outlet of the multi-stage turbine at the third pressure 214. Upon exit of the multi-stage turbine, the second portion 122 may flow into the auxiliary line 121 as described herein, and the first portion 120 may flow into the second heat exchanger 108.

The auxiliary line 121 may include the third heat exchanger 27, a heat rejection heat exchanger 126, and a second pump 128 that may be fluidly connected to the second fluid circuit 103 between the first turbine 116 and the first heat exchanger 112. The heat rejection heat exchanger 126 and the second pump 128 may be connected in series.

The second portion 122 of the second working fluid 102 may circulate through the third heat exchanger 27. The second portion 122 may transfer thermal energy to the third material of the waste heat reservoir 164 and may bring the second portion 122 to state 201. The thermal energy from the second portion 122 may be stored in the waste heat reservoir 164 for later use, for example, during the charging cycle 200. The second portion 122 may flow into the heat rejection heat exchanger 126. The second portion 122 may be cooled to near an ambient temperature in the heat rejection heat exchanger 126. The heat rejection heat exchanger 126 may reject the heat to the environment. 'Near an ambient temperature' may include a fluid temperature in the range of about zero to about 10 degrees Celsius (10 C), about zero to about 20 C, about zero to about 30 C, or a lower or higher temperature differential, of the temperature of the surrounding environment.

The heat transferred to the waste heat reservoir 164 and rejected by the heat rejection heat exchanger 126 may eliminate excess heat in the PTES system 10 that was created due to irreversible thermodynamic process during the charging cycle 200 and the generating cycle 202. The combination of the third pressure 214 and lower temperature may result in a high-density fluid state at an outlet of the heat rejection heat exchanger 126. Because the heat rejection process of the heat rejection heat exchanger 126 may be decoupled from the recuperator 114 via the auxiliary generating cycle 204, a greater amount of residual enthalpy may be recovered by the PTES system 10. After the second portion 122 exits the heat rejection heat exchanger 126, the second portion 122 may enter the second pump 128 where the pressure of the second portion 122 of the working fluid may be increased to the second pressure 216. Because the second portion 122 is in a high-density fluid state, the work required to raise the pressure of the second portion 122 may be significantly reduced. After the second portion 122 of the working fluid exits the second pump 128, the second portion is at a state that may be close to that of state of the second working fluid 102 after is leaves the recuperator 114. Therefore, the second portion 122 may be combined with the second working fluid 102 at the combination point 130.

Figure 4:
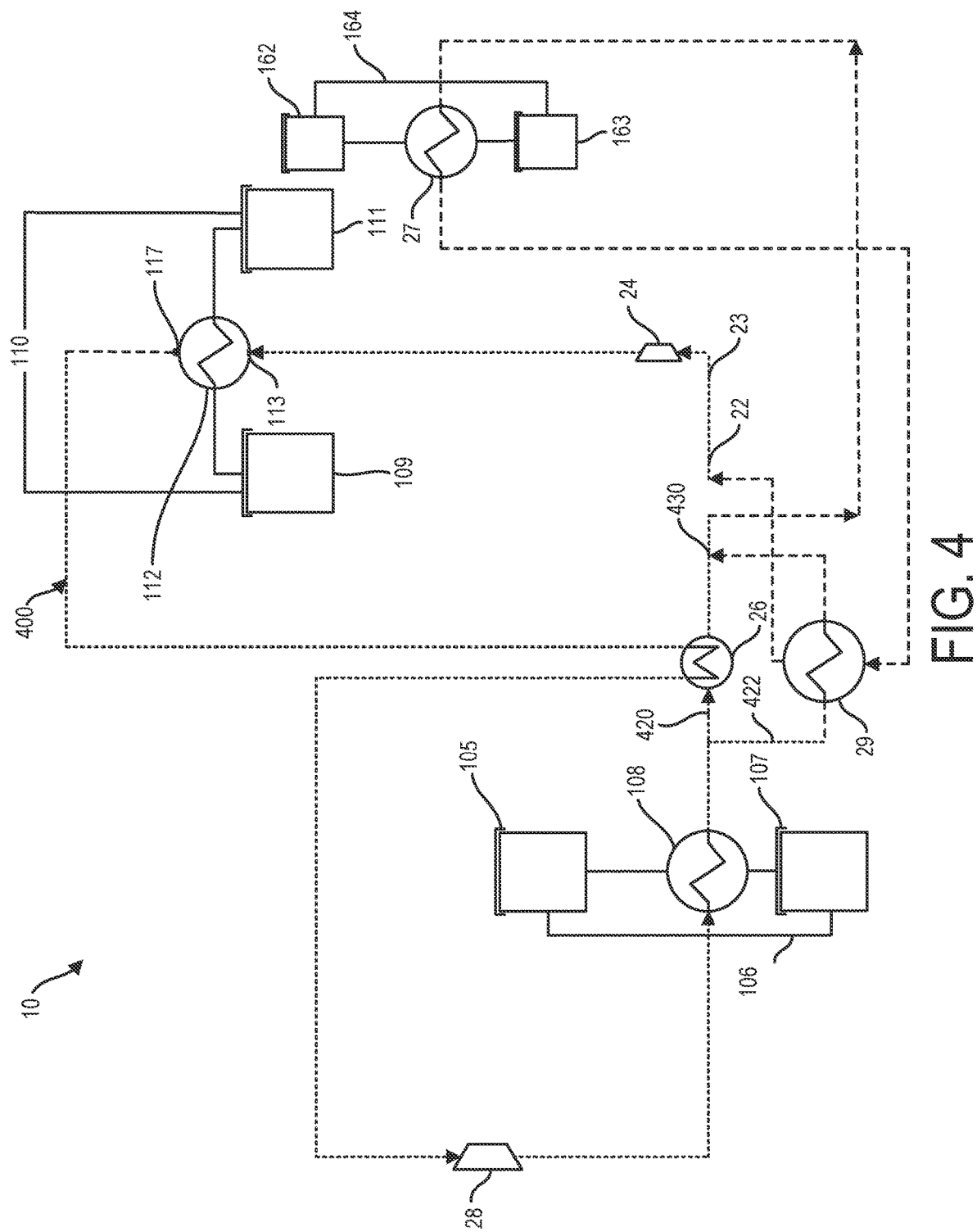
FIG. 4 is a schematic of an alternative example charging system of the PTES system shown in FIG. 3, according to one or more embodiments disclosed.
Figure 5:
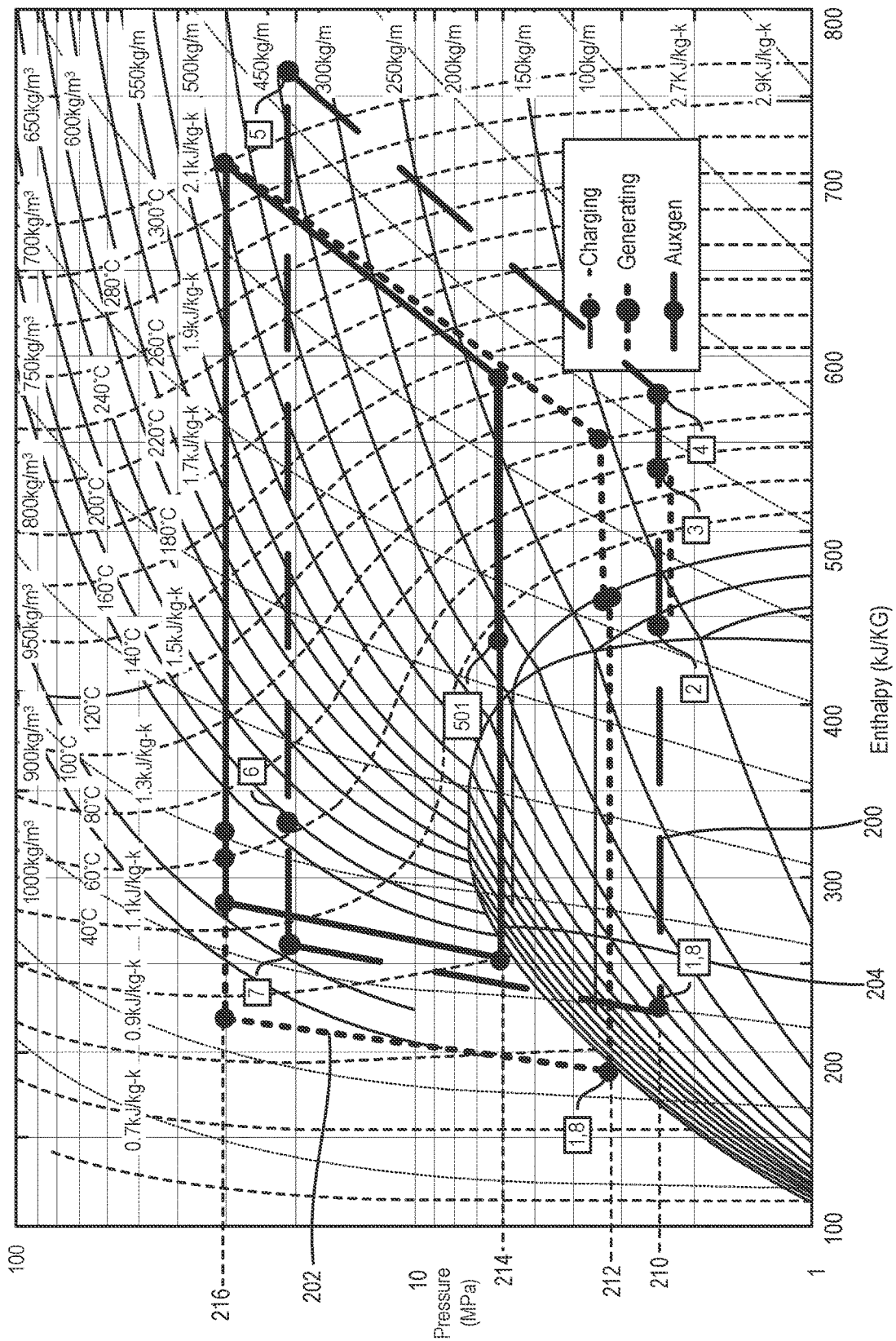
FIG. 5 is a pressure enthalpy diagram for the alternative example charging system of FIG. 4 operating with the PTES system of FIG. 3, according to one or more embodiments disclosed.

FIG. 4 is a schematic of an alternative example charging system 400 of the PTES system 10 shown in FIG. 3, according to one or more embodiments disclosed. FIG. 5 is a pressure enthalpy diagram for the alternative example charging system 400 of FIG. 4 operating with the PTES system 10 of FIG. 3. Referring to FIG. 4 and FIG. 5, the waste heat reservoir 164 may store thermal energy from the PTES system 10 introduced during a given generating cycle described herein. As depicted in FIG. 5, the thermal energy may have been stored in the waste heat reservoir 164 during the portion of the generating cycle that lowered the second portion 122 temperature, with reference to FIG. 3, to the state depicted on FIG. 5 as temperature and pressure 501. The charging system 400 may include a fourth heat exchanger 29 fluidly connected to the first fluid circuit 23. The first working fluid 22 may be split into a first portion 420 and a second portion 422 after discharge from the second heat exchanger 108 and before entering the recuperator 26. Thermal energy from the waste heat reservoir 164 may be transferred to the second portion 422 to increase the temperature of the second portion 422 of the first working fluid 22. The recuperator 26 may increase the temperature of the second portion 420. Overall energy savings may be realized by utilizing some of the thermal energy from the waste heat reservoir 164 through the heat exchanger 29 to raise the temperature of the second portion 422. The first portion 420 and the second portion 422 may be combined at a combination point 430 and may be in the third state 3 of the charging cycle 200. The first working fluid 22 may move through the third heat exchanger 27 to gain additional thermal energy from the waste heat reservoir 164 prior to entering the compressor 24. After exiting the waste heat reservoir 164, the first working fluid 22 may be in the fourth state 4 of the charging cycle 200. The charging system 400 may otherwise function in a substantially similar manner to the charging system 20 in FIG. 1.

Figure 6:
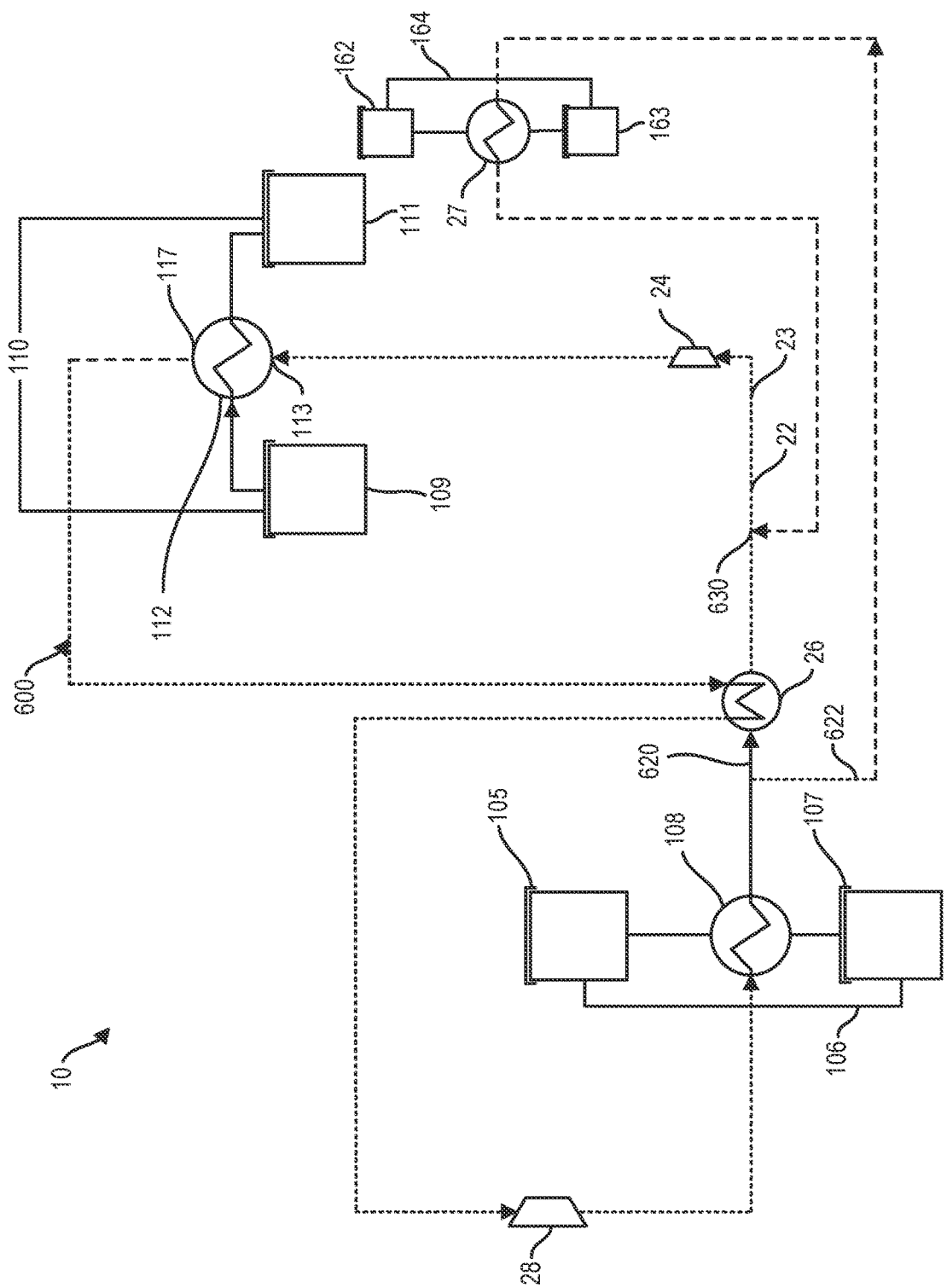
FIG. 6 is a schematic of another alternate example charging system of the PTES system shown in FIG. 3, according to one or more embodiments disclosed.
Figure 7:
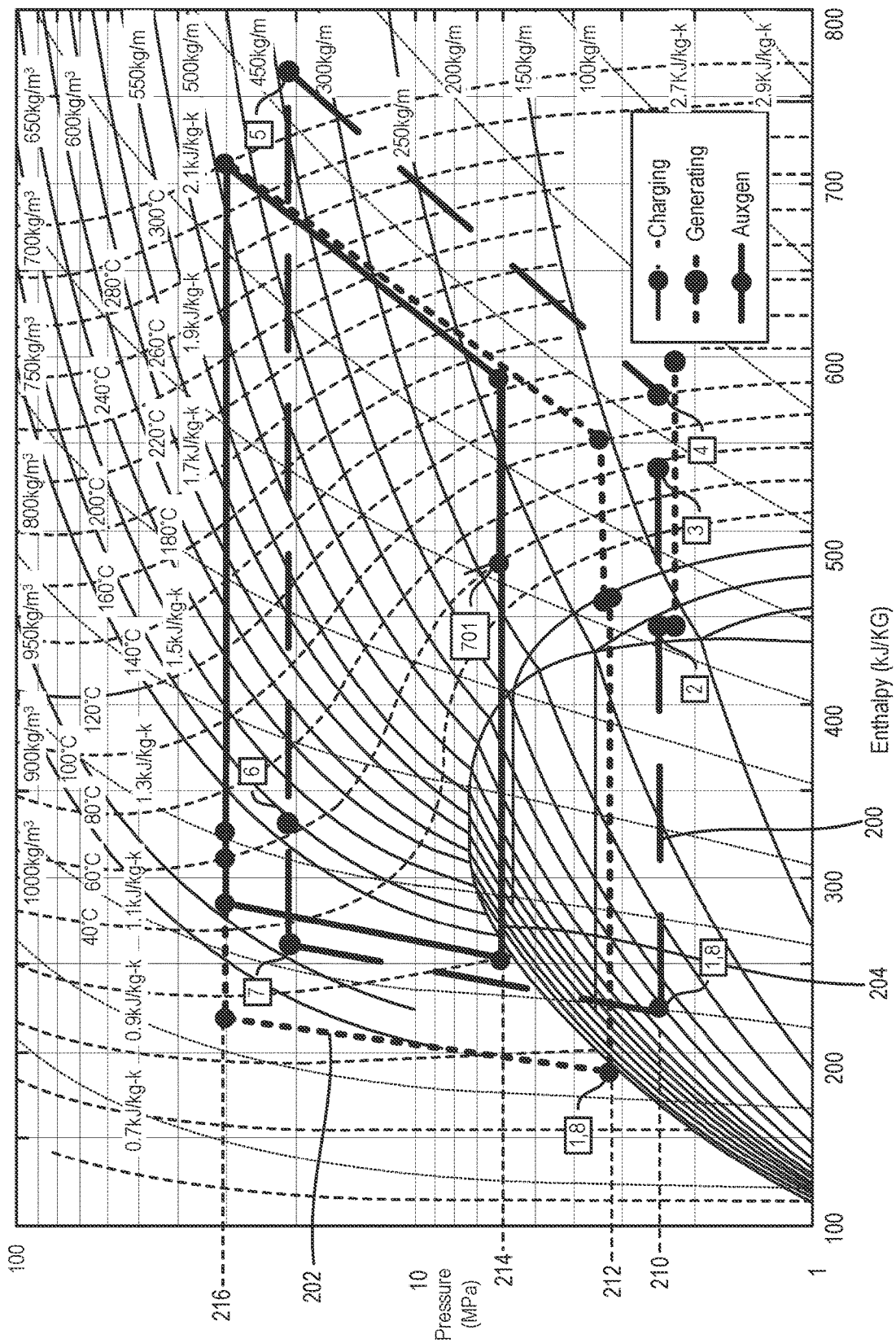
FIG. 7 is a pressure enthalpy diagram for the alternative example charging system of FIG. 6 operating with the PTES system of FIG. 3, according to one or more embodiments disclosed.

FIG. 6 is a schematic of another alternate example charging system 600 of the PTES system 10 shown in FIG. 3, according to one or more embodiments disclosed. FIG. 7 is a pressure enthalpy diagram for the alternative example charging system 600 of FIG. 6 operating with the PTES system 10 of FIG. 3, according to one or more embodiments disclosed. Referring to FIG. 6 and FIG. 7, the waste heat reservoir 164 may store thermal energy from the PTES system 10 introduced during a given charging cycle described herein. As depicted in FIG. 6, the thermal energy may have been stored in the waste heat reservoir 164 during the portion of the generation cycle that lowered the second portion 122 temperature, with reference to FIG. 3, to the state depicted in FIG. 7 as temperature and pressure 701. The first working fluid 22 may be split into a first portion 620 and a second portion 622 after discharge from the second heat exchanger 108 and before entering the recuperator 26. Thermal energy from the waste heat reservoir 164 may be transferred to the second portion 622 to increase the temperature of the second portion 622 of the first working fluid 22. The recuperator 26 may increase the temperature of the first portion 620. Overall energy savings may be realized by utilizing thermal energy from the waste heat reservoir 164 through the heat exchanger 27 to raise the temperature of the second portion 622. The first portion 620 and the second portion 622 may be combined at a combination point 630 and may be in the fourth state 4 of the charging cycle 200. The charging system 600 may otherwise function in a substantially similar manner to the charging system 20 in FIG. 1.

As discussed earlier, one metric of overall cycle performance of PTES systems is round-trip efficiency ("RTE"). The RTE may be defined as the amount of electrical energy that can be produced during one cycle of a generating cycle of a PTES system divided by the amount of electrical energy that was consumed during one cycle of a charging cycle of a PTES system. In each of the PTES systems described above, the RTE may be improved in comparison to traditional PTES systems and a greater amount of electricity from the PTES systems may be recovered. While traditional PTES systems usually have an estimated RTE of 55-56%, the PTES system 10 with charging system 20, 400, and 600 disclosed herein may result in an estimated RTE of about 56% to about 61% or about 56% to about 66% or higher.

Figure 8:
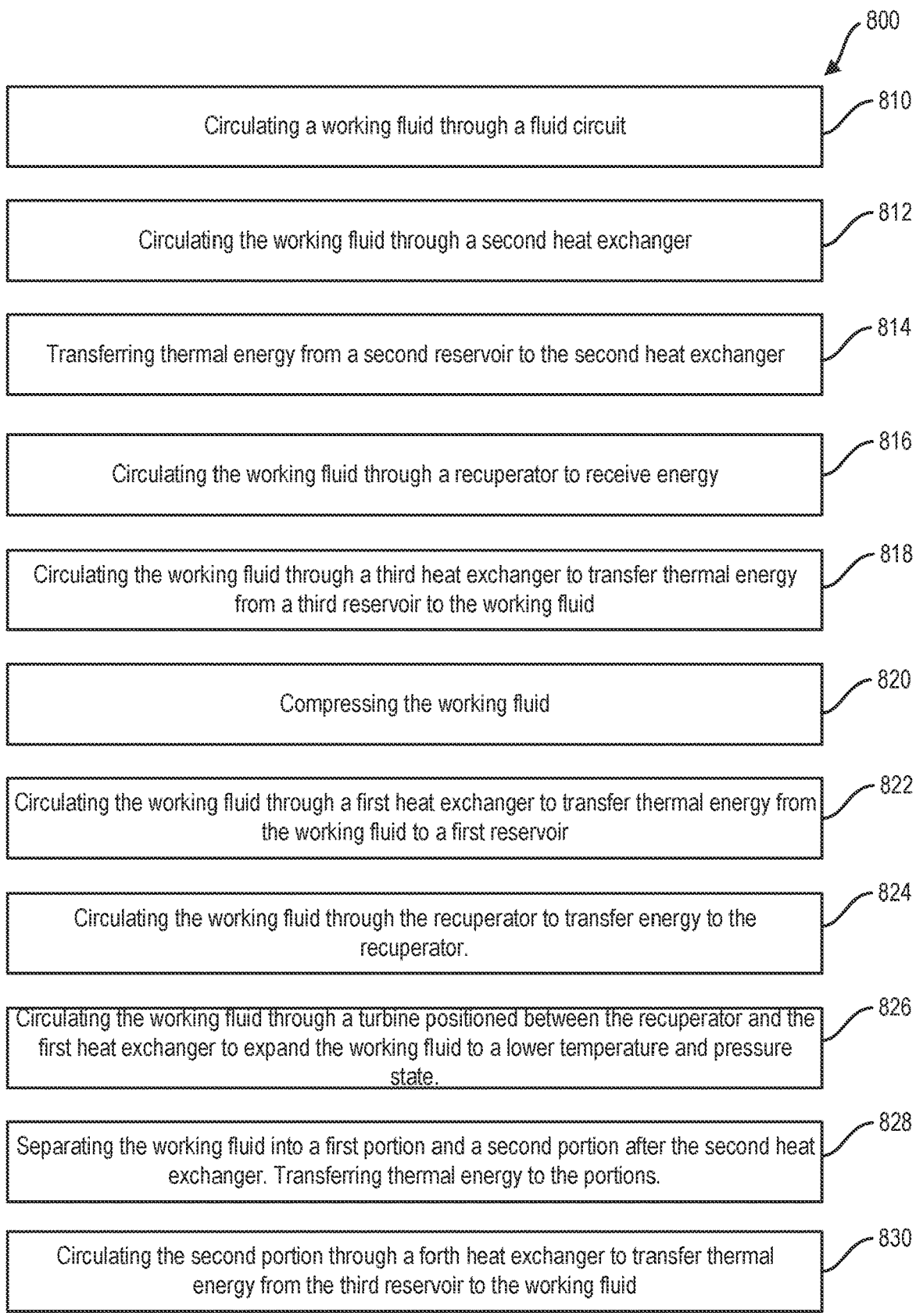
FIG. 8 is a flowchart depicting methods for charging the PTES system, according to one or more embodiments disclosed.

FIG. 8 is a flowchart depicting methods for charging the PTES system 10, according to one or more embodiments disclosed. A method 800 for charging a pumped thermal energy system is disclosed. In 810, the method 800 may include circulating a working fluid through a fluid circuit. The fluid circuit may include a first heat exchanger, a second heat exchanger, and a third heat exchanger connected thereto. A pump, turbine, and/or compressor may be used therewith to circulate the fluid therethrough.

In 812, the method 800 may include circulating the working fluid through the second heat exchanger. The working fluid may be circulated by the pump, turbine, and/or compressor. The pump may circulate the working fluid without changing its pressure. The pump, turbine, and/or compressor may circulate the working fluid and may change its pressure and/or temperature.

In 814, the method 800 may include transferring thermal energy from a second or low temperature reservoir to the second heat exchanger to facilitate thermal energy transfer with the working fluid. Accordingly, as the working fluid moves through the second heat exchanger, the thermal energy of the working fluid may be increased.

In 816, the method 800 may include circulating the working fluid through a recuperator to increase the thermal energy of the working fluid.

In 818, the method 800 may include circulating the working fluid through the third heat exchanger. The thermal energy from a third or waste heat reservoir may be transferred to the working fluid by the third heat exchanger. As the working fluid moves through the third heat exchanger, the thermal energy of the working fluid may be increased.

In 820, the method 800 may include compressing the working fluid through a compressor. As the working fluid moves through the compressor, the temperature and pressure of the working fluid may be increased.

In 822, the method 800 may include circulating the working fluid through the first heat exchanger to transfer thermal energy from the working fluid to a first or high temperature reservoir storing the thermal energy within the high temperature reservoir. As the working fluid moves through the first heat exchanger, the first reservoir may be heated, and the thermal energy may be stored within the first reservoir for later use during a generation cycle. Accordingly, the thermal energy of the working fluid may be decreased.

In 824, the method 800 may include circulating the working fluid through the recuperator to transfer energy to and from the working fluid. Circulating the working fluid through the recuperator, the thermal energy in the working fluid may be further reduced.

In 826, the method 800 may include expanding the working fluid via a turbine fluidly connected to the fluid circuit. The turbine may be positioned between the first heat exchanger and the second heat exchanger of the fluid circuit. Moving the working fluid through the turbine may expand the working fluid to a lower temperature and pressure.

In 828, the method 800 may include separating the working fluid into a first portion and a second portion after moving the working fluid through the second heat exchanger. Transferring thermal energy to the first portion by circulating the first portion through the recuperator. Transferring thermal energy to the second portion by circulating the second portion through the third heat exchanger. The first portion and the second portion may be recombined at a point between the recuperator and the compressor. The working fluid may be separated into the first portion and the second portion after the working fluid is moved through the recuperator.

In 830 the method 800 may include circulating the second portion through a fourth heat exchanger to transfer thermal energy from the third reservoir to the second portion. The first portion and the second portion may be recombined at a point between the recuperator and the third heat exchanger. The recombined portions may be circulated through the third heat exchanger and then moved through the compressor.

The present disclosure further relates to any one or more of the following numbered embodiments:

First, a charging system in a pumped thermal energy storage ("PTES") system, comprising: a fluid circuit for circulating a working fluid therethrough, the fluid circuit comprising: a first heat exchanger through which the working fluid circulates in use; a second heat exchange through which the working fluid circulates in use; a third heat exchanger through which the working fluid circulates in use; a compressor through which the working fluid circulates in use, wherein the working fluid enters the second heat exchanger at a first temperature and the working fluid exits the second heat exchanger at a second temperature, wherein the working fluid enters the third heat exchanger at the second temperature and the working fluid exits the third heat exchanger at a third temperature, wherein the working fluid enters the compressor at the third temperature and a first pressure, and the working fluid exits the compressor at a fourth temperature and a second pressure, and wherein the working fluid enter the first heat exchanger at the fourth temperature and the working fluid exits the first heat exchanger at a fifth temperature, the fifth temperature being lower than the fourth temperature; a turbine positioned between the first heat exchanger and the second heat exchanger, the turbine for expanding the working fluid to the first temperature and the first pressure; a high temperature reservoir connected to the first heat exchanger for transferring thermal energy to and from the working fluid; and a low temperature reservoir connected to the second heat exchanger for transferring thermal energy to and from the working fluid; and a heat source connected to the third heat exchanger for transferring thermal energy to and from the working fluid.

Second, the charging system of the first embodiment, wherein the heat source comprises a waste heat from a PTES generating cycle stored in a waste heat reservoir.

Third, the charging system of the first or second embodiments, wherein the heat source comprises thermal energy from a separate industrial process.

Fourth, the charging system according to any of the first to third embodiments, wherein the working fluid is split into a first portion and a second portion after exiting the second heat exchanger and prior to entering the compressor.

Fifth, the charging system according to any of the first to fourth embodiments, wherein the fluid circuit further comprises a recuperator positioned between the second heat exchanger and the third heat exchanger.

Sixth, the charging system according to any of the first to fifth embodiments, wherein the working fluid is split into a first portion and a second portion prior to entering the recuperator.

Seventh, the charging system according to any of the first to sixth embodiment, wherein the first portion is circulated through the recuperator, the second portion is circulated through the third heat exchanger and wherein the first and second portions are recombined at a location in the fluid circuit between the recuperator and the compressor.

Eighth, the charging system according to any of the first to seventh embodiments, wherein the fluid circuit further comprises a fourth heat exchanger wherein the first portion is circulated through the recuperator, the second portion is circulated through the fourth heat exchanger, and wherein the first and second portions are recombined at a location in the fluid circuit between the recuperator and the third heat exchanger.

Ninth, the charging system according to any of the first to eighth embodiments, wherein the fluid circuit further comprises a generating system in the PTES.

Tenth, a generation system in a pumped thermal energy storage ("PTES") system, comprising: a fluid circuit for the circulation of a working fluid therethrough, the working fluid comprising a first portion and a second portion comingled together, the fluid circuit comprising: a pump to circulate the working fluid within the fluid circuit, wherein the working fluid enters the pump at a first pressure, and the working fluid exits the pump at a second pressure, a first heat exchanger through which the working fluid circulates in use; a second heat exchanger through which the working fluid circulates in use; a first turbine positioned between the first heat exchanger and the second heat exchanger and wherein the first turbine is for expanding the working fluid to a third pressure, the third pressure greater than the first pressure and less than the second pressure; a separation location where the working fluid is separated into the first portion and the second portion, a second turbine positioned between the first heat exchanger and the second heat exchanger and wherein the second turbine if for expanding the first portion of the working fluid to the first pressure; an auxiliary line through which the second portion of the working fluid circulates between the turbine and the first heat exchanger, a third heat exchanger through which the working fluid circulates in use positioned between an outlet of the turbine and an inlet of a heat rejection heat exchanger, and in fluid communication with the auxiliary line, wherein the third heat exchanger removes thermal energy from the second portion of the working fluid; the heat rejection heat exchanger positioned between an outlet of the third heat exchanger and an inlet of the first heat exchanger, and in fluid communication with the auxiliary line, wherein the heat rejection heat exchanger removes thermal energy from the second portion of the working fluid; a high temperature reservoir connected to the first heat exchanger for transferring thermal energy to and from the working fluid; a low temperature reservoir connected to the second heat exchanger for transferring thermal energy to and from the working fluid; and a waste heat reservoir connected to the third heat exchanger for transferring thermal energy to and from the working fluid.

Eleventh, the generation system of the tenth embodiment, wherein the waste heat reservoir stores a waste heat from the PTES system Twelfth, the generation system of the tenth or eleventh embodiments, wherein the heat rejection heat exchanger decreases the temperature of the second portion of the working fluid to within zero to 10 C of an ambient temperature of a surrounding environment.

Thirteenth, the generation system according to any of the tenth to twelfth embodiments, wherein the heat rejection heat exchanger releases the thermal energy of the second portion of the working fluid to the surrounding environment.

Fourteenth, the generation system according to any of the tenth to thirteenth embodiments, wherein the working fluid is split into the first portion and the second portion after exiting the first turbine.

Fifteenth, the generation system according to any of the tenth to fourteenth embodiments, wherein the auxiliary line includes a second pump positioned between the heat rejection heat exchanger and the first heat exchanger, the second pump for increasing the pressure of the second portion of the working fluid.

Sixteenth, the generation system according to any of the tenth to fifteenth embodiments, wherein the fluid circuit includes a recuperator positioned between the second turbine and the second heat exchanger.

Seventeenth, the generation system according to any of the tenth to sixteenth embodiments, wherein the third heat exchanger is in fluid communication with the heat rejection heat exchanger.

Eighteenth, a method for charging a pumped thermal energy system, comprising: circulating a working fluid through a fluid circuit, wherein the fluid circuit comprises a first heat exchanger, a second heat exchanger, and a third heat exchanger connected thereto; circulating the working fluid through the second heat exchanger; providing thermal energy from the second heat exchanger to the working fluid; circulating the working fluid through a recuperator; circulating the working fluid through the third heat exchanger, wherein a waste heat reservoir storing waste heat transfers thermal energy to the working fluid to increase its temperature; circulating the working fluid through a compressor; and circulating the working fluid through the first heat exchanger to transfer thermal energy from the working fluid to a high temperature reservoir connected to the first heat exchanger.

Nineteenth, the method of the eighteenth embodiment, further comprising circulating the working fluid through a recuperator that is positioned in the fluid circuit between the first heat exchanger and the second heat exchanger.

Twentieth, the method of either of the eighteenth or nineteenth embodiments, further comprising providing thermal energy from a low temperature reservoir to the second heat exchanger to facilitate thermal energy transfer with the working fluid.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A charging system in a pumped thermal energy storage ("PTES") system, comprising:
a fluid circuit for circulating a working fluid therethrough and through which the working fluid circulates in use, the fluid circuit comprising:
a first heat exchanger;
a second heat exchanger;
a third heat exchanger;
a recuperator; and
a compressor,
wherein:
the working fluid enters the second heat exchanger at a first temperature and exits the second heat exchanger at a second temperature,
the working fluid splits into a first portion and a second portion after exiting the second heat exchanger at the second temperature and before entering the recuperator;
the first portion of the working fluid enters the recuperator from the split at the second temperature and exits at a third temperature;
the second portion of the working fluid enters the third heat exchanger from the split at the second temperature and exits the third heat exchanger at a fourth temperature,
the first portion of the working fluid and the second portion are combined upon the first portion exiting the recuperator at the third temperature and upon the second portion exiting the third heat exchanger at the fourth temperature;
the combined first portion of the working fluid and the second portion of the working fluid enters the compressor at a fifth temperature and a first pressure and exits the compressor at a sixth temperature and a second pressure, and the combined first portion of the working fluid and the second portion of the working fluid enters the first heat exchanger from the compressor at the sixth temperature and exits the first heat exchanger at a seventh temperature; and the combined first portion of the working fluid and the second portion of the working fluid enters the recuperator from the first heat exchanger at the seventh temperature and exits at an eighth temperature;

a turbine positioned between the recuperator and the second heat exchanger, the combined first portion of the working fluid and the second portion of the working fluid entering the turbine from the recuperator at the eighth temperature, the turbine for expanding the working fluid to the first temperature and the first pressure;

a high temperature reservoir connected to the first heat exchanger for transferring thermal energy to and from the working fluid;

a low temperature reservoir connected to the second heat exchanger for transferring thermal energy to and from the working fluid; and a heat source connected to the third heat exchanger for transferring thermal energy to and from the working fluid.

2. The charging system of claim 1, wherein the heat source comprises a waste heat from a PTES generating cycle stored in a waste heat reservoir.

3. The charging system of claim 1, wherein the heat source comprises thermal energy from a separate industrial process.

4. The charging system of claim 1, wherein the fluid circuit further comprises a generating system in the PTES.

5. A method for charging a pumped thermal energy system ("PTES"), comprising:
    circulating a working fluid through a fluid circuit, the fluid circuit comprising a first heat exchanger, a second heat exchanger, a third heat exchanger, and a recuperator positioned between the second heat exchanger and the first heat exchanger connected thereto;
    circulating the working fluid through the second heat exchanger, the working fluid entering the second heat exchanger at a first temperature and exiting the second heat exchanger at a second temperature;
    providing thermal energy from the second heat exchanger to the working fluid;
    splitting the working fluid into a first portion and a second portion after exiting the second heat exchanger at the second temperature;
    circulating the first portion of the working fluid at the second temperature through the recuperator, the first portion exiting the recuperator at a third temperature;
    circulating the second portion of the working fluid through the third heat exchanger, wherein:
        a waste heat reservoir storing waste heat transfers thermal energy to the second portion to increase its temperature; and
        the second portion enters the third heat exchanger at the second temperature and exits the third heat exchanger at a fourth temperature;
    combining the second portion of the working fluid and the first portion of the working fluid after the first portion has exited the recuperator and after the second portion has exited the third heat exchanger;
    circulating the combined first portion of the working fluid and second portion of the working fluid through a compressor, the working fluid entering the compressor at a fifth temperature and a first pressure and exiting the compressor at a sixth temperature and a second pressure; and
    circulating the combined first portion of the working fluid and second portion of the working fluid through the first heat exchanger to transfer thermal energy from the working fluid to a high temperature reservoir connected to the first heat exchanger, the combined first portion and second portion entering the first heat exchanger at the sixth temperature and exiting the first heat exchanger at a seventh temperature.

6. The method of claim 5, further comprising providing thermal energy from a low temperature reservoir to the second heat exchanger to facilitate thermal energy transfer with the working fluid.

7. The method of claim 5, wherein the waste heat reservoir comprises thermal energy from a separate industrial process.

8. The method of claim 5, wherein the waste heat reservoir comprises a waste heat from a PTES generating cycle.

9. The method of claim 5, wherein the fluid circuit further comprises a generating system in the PTES.

10. A charging system in a pumped thermal energy storage ("PTES") system, comprising:
    a fluid circuit for circulating a working fluid therethrough and through which the working fluid circulates in use, the fluid circuit comprising:
        a first heat exchanger;
        a second heat exchanger;
        a third heat exchanger;
        a fourth heat exchanger;
        a recuperator;
        a compressor, and
        a turbine;
        wherein:
            the working fluid enters the second heat exchanger at a first temperature and a first pressure and exits the second heat exchanger at a second temperature,
            the working fluid splits into a first portion and a second portion upon exiting the second heat exchanger at the second temperature and before entering the recuperator;
            the first portion enters the recuperator from the split at the second temperature and exits at a third temperature;
            the second portion enters the third heat exchanger from the split at the second temperature and exits the third heat exchanger at a fourth temperature,
            the first portion and the second portion are combined, upon the first portion exiting the recuperator at the third temperature and upon the second portion exiting the third heat exchanger at the fourth temperature, to form a combined portion at a fifth temperature;
            the combined portion enters the compressor at the fifth temperature and a second pressure and exits the compressor at a sixth temperature and a third pressure;
            the combined portion enters the first heat exchanger at the sixth temperature and exits at a seventh temperature;
            the combined portion enters the recuperator at the seventh temperature and exits at an eighth temperature; and the combined portion enters the turbine at the eighth temperature and exits the turbine at the first temperature and the first pressure;

a high temperature reservoir connected to the first heat exchanger for transferring thermal energy to and from the working fluid;

a low temperature reservoir connected to the second heat exchanger for transferring thermal energy to and from the working fluid; and a heat source connected to the third heat exchanger for transferring thermal energy to and from the working fluid.

11. The charging system of claim 10, wherein the heat source comprises a waste heat from a PTES generating cycle stored in a waste heat reservoir.

12. The charging system of claim 10, wherein the heat source comprises thermal energy from a separate industrial process.

13. The charging system of claim 10, wherein the fluid circuit further comprises a generating system in the PTES.

* * * * *